United States Patent [19]

Marro

[11] 3,715,620

[45] Feb. 6, 1973

[54] COMPENSATION DEVICE FOR NON-LINEAR ELECTROMAGNETIC SYSTEMS

[75] Inventor: Dominic P. Marro, Chelmsford, Mass.

[73] Assignee: Itek Corporation, Lexington, Mass.

[22] Filed: Sept. 15, 1970

[21] Appl. No.: 72,472

[52] U.S. Cl. .....315/27, 250/213

[51] Int. Cl. .....H01j 29/76, H01j 29/70

[58] Field of Search .....315/27 R, 27 TD, 276 D, 10; 250/213 VT

[56] References Cited

UNITED STATES PATENTS

| | | | |
|---|---|---|---|
| 3,129,355 | 4/1964 | Wood | 315/27 R |
| 2,859,329 | 11/1958 | Ellis | 315/27 R |
| 2,906,919 | 9/1959 | Thor et al. | 315/27 R |
| 3,393,320 | 7/1968 | Arazl | 250/217 R |

*Primary Examiner*—Reuben Epstein
*Attorney*—Homer O. Blair, Robert L. Nathans, William C. Roch and Lester S. Grodberg

[57] ABSTRACT

Apparatus is disclosed which compensates for non-linear responses of electromagnetic systems which apparatus includes a hysteresis simulator. The simulator samples an input signal to the system and produces an output signal which when combined with the original input effects a linear response of the electromagnetic system with respect to the original input signal.

11 Claims, 7 Drawing Figures

DOMINIC P. MARRO
INVENTOR.

BY
Lester S. Grodberg
ATTORNEY

DOMINIC P. MARRO
INVENTOR.

BY
Lester S. Grodberg
ATTORNEY

DOMINIC P. MARRO
INVENTOR.

BY
Lester S. Grodberg
ATTORNEY

COMPENSATION DEVICE FOR NON-LINEAR ELECTROMAGNETIC SYSTEMS

CHARACTERIZATION OF INVENTION

The invention is characterized in a device for use in combination with an electromagnetic system having a non-linear transfer function which function includes a linear component and a non-linear component; the device comprises means for sensing an input signal to said system; means for transforming said sensed input signal to a signal exhibiting similar non-linearities to the non-linear component of the transfer function; means for combining the input signal and the non-linear signal; means for applying the combined signal to the system, thereby obtaining a linear response to the input signal.

FIELD OF INVENTION

This invention relates to a compensation device for the non-linear responses of electromagnetic systems and more particularly to such a device for use in conjunction with the deflection coils of image tubes to compensate for non-linearities of the magnetics of the tubes and coils.

Generally, electromagnetic devices exhibit non-linear transfer functions; that is, the output of these devices is not related to the input in a linear fashion.

The conversion of electrical energy into magnetic energy to perform a task may be analyzed as a number of separate subconversions:

a. the electrical energy input is converted into magnetomotive force;

b. the magnetomotive force acting upon a magnetic medium produces a magnetic flux; and c. the energy of the magnetic flux performs work.

The non-linearities exhibited by electromagnetic devices occur in large part during the conversion of the magnetomotive force to a magnetic flux. These non-linearities are due in large part to losses in the magnetic materials such as saturation, hysteresis and eddy current losses.

In many electromagnetic systems a predictable linear response to an input signal is most desirable. To attain such a response, various methods and arrangements have been employed in the past. One method attempts to utilize only small portions of the operating ranges of the electromagnetic device. Because of the inherent variable response of magnetic devices, even within limited operating ranges, this method has enjoyed limited success. There have been developed magnetic materials which exhibit substantially linear responses over large portions of their operating curves. These materials are not always compatible thermally with glass and ceramics used in electro-optic imaging devices. Further, machining and other operations, such as heat treatment, often change the magnetic characteristics of the material in unpredictable non-uniform and non-linear ways. Another method of compensation for non-linearities is to design systems employing empirically developed geometrics and materials such that the non-linearities of the various magnetic components balance one another to produce a linear response. Such empirical design methods are costly since results are often unpredictable; each individual device so compensated must be individually matched with each compensating element.

SUMMARY OF INVENTION

An object of the invention is to provide means to compensate for electromagnetic system non-linearities.

Another object is to provide such means which have universal application to electromagnetic systems.

A still further object is to simulate electrically non-linearities in electromagnetic systems and to utilize the simulated signal to compensate for such non-linearities.

Yet another object is to compensate for such non-linearities without adding substantial weight, volume, cost or power needs to the system.

A further object is to compensate for non-linearities in image tubes employing electromagnetic particle deflection.

The invention is achieved by apparatus sampling the input signal to an electromagnetic device, transforming the input signal to an error signal similar to the non-linear component of the transfer function of the device, and combining the error signal with the original input signal in such a manner to effect a linear output response of the device to the original input signal.

DISCLOSURE OF PREFERRED EMBODIMENTS

Other objects, features and advantages will occur from the following description of preferred embodiments and the accompanying drawings, in which:

FIG. 1 is a block diagram outlining the basic concept of the invention;

FIG. 2*a* illustrates a typical hysteresis loop or transfer function for an electromagnetic device wherein the abscissa is a scale of the input current and magnetic flux, and the ordinate is a scale of the magnetizing force;

FIG. 2*b* depicts (in solid lines) the non-linear portion of the curve of FIG. 2*a* and (in dash lines) the linear portion;

FIG. 2*c* shows the output curve of the compensating device of FIG. 1 in dashed lines, and the linear input and non-linear correction curve generated within the device in solid lines;

Figure 1:
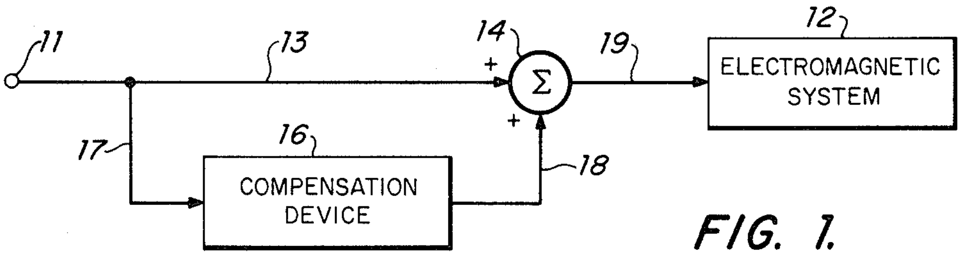

A signal is impressed upon input terminal 11, FIG. 1, to effect a desired result on an electromagnetic system 12. The signal is transmitted over lead 13 to summing means 14 and over lead 19 to the electromagnetic system 12. This input signal is also sampled by compensation device 16 via lead 17. The output of the compensation device appearing on lead 18 is fed to summing means 14 and there is combined with the signal on lead 13, the original input.

The compensation device 16, sampling the input, provides a signal at summation device 14 which signal when added to the original input appearing at terminal 11 produces a signal on lead 19 which compensates for the non-linear portion of the transfer function of the electromagnetic system 12. This provides a signal to the system 12 which signal causes a linear and predictable output of the electromagnetic system 12 relative to and in response to the input signal appearing at terminal 11. The circuit illustrated in FIG. 1 takes an open loop approach to compensating for the non-linear response of the electromagnetic system 12. An open loop circuit is a circuit which does not feed back a portion of the output signal back to the input to modify the circuit response.

Figure 2A:
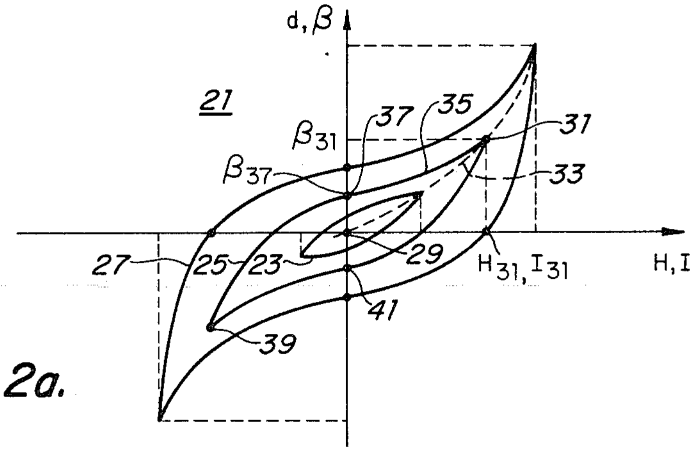

A typical transfer function 21, or family of curves, FIG. 2*a*, for an electromagnetic system has an abscissa showing input current (I) and an ordinate depicting work function output from the electromagnetic system. Since the input signal is linearly related to magnetizing force ($H$) and the work function is linearly related to magnetic flux ($B$), the family of curves may also represent a plot of the magnetic $B$–$H$ curves, hysteresis loops, of an electromagnetic system.

A full discussion of the electromagnetic phenomena and graphic representation of them by means of hysteresis loops is disclosed in *Magnetic Circuits and Transformers*, pp. 18 et seq., (John Wiley & Sons, Inc., New York, New York, February 1957).

Transfer function 21 is depicted as composed of three loops, 23, 25 and 27. In fact, however, the electromagnetic system may operate anywhere within the region encompassed by loop 27. An infinite number of $B$–$H$ loops exists within this region.

Assume that the system 12, FIG. 1, is initially in a demagnetized state as represented by a point 29, FIG. 2, at the origin of the graph. A positive current $I_{31}$ applied to the system induces a magnetizing force $H_{31}$. This force creates a magnetic flux of value $B_{31}$. The graphic representation of the electromagnetic transfer is shown by the excursion from the origin 29 to point 31 along the dotted line 33. If the current is reduced to zero, the magnetizing force $H$ is also reduced to zero and the $B$–$H$ loop is traversed along curve 25 until the point 37 is reached. At this point, $B$ has a finite and positive value, $B_{37}$. This value is designated as the remanence or remanent magnetism in the system, that flux density remaining in the system after the energizing current is removed.

The application of current to the system now causes excursions along the $B$–$H$ loop 25. Negative currents cause excursions in the fourth quadrant toward point 39. If a current equals or exceeds a magnitude sufficient to operate at point 39 and thereafter such current is removed, the device seeks point 41, the point of negative remanent magnetism. If, however, current changes are rapid both in direction and magnitude, the operation may change from the $B$–$H$ loop 25 to either of loops 23 or 27, or other loops not shown. Thus, it is relatively impossible to predict the magnetic flux $B$ generated in response to a given current I.

Figure 2B:
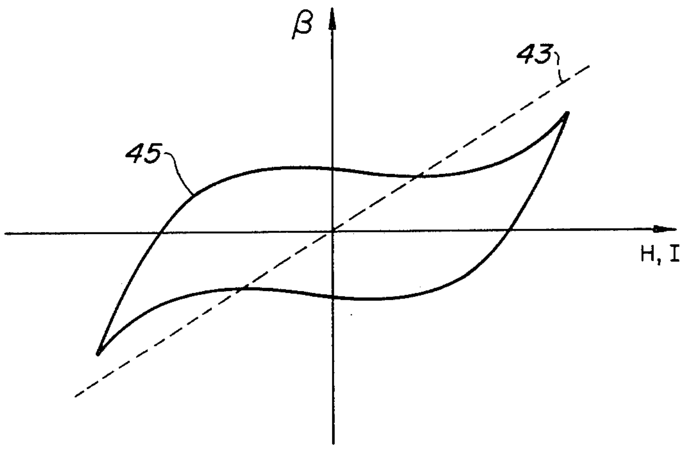

The transfer function 21 has a linear component 43, FIG. 2*b*, and a non-linear component 45. For simplicity, only the outer envelope of the non-linear component 45 is shown. This envelope represents the entire non-linear portion of transfer function 21 and its associated infinite family of $B$–$H$ loop within the envelope. The only difference between curve 45 and transfer function 21 is that curve 45 has its primary axis on the abscissa and curve 21 has its primary axis on a diagonal which is identical to linear component 43.

Figure 2C:
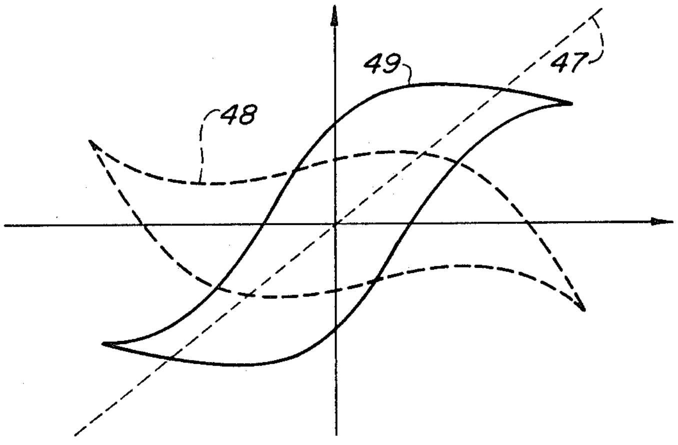

FIG. 2c depicts a transfer function 49 having a non-linear portion 48 and a linear portion 47. The curve 48 is the algebraic negative of non-linear component 45, FIG. 2b. The diagrammatic distinction between curve 48 and curve 45 is that either is the mirror image of the other about the abscissa.

Since the actual response of the system 12 is curve 21, FIG. 2*a*, and the desired response curve 43, FIG. 2*b*, the error signal is the difference curve 45, FIG. 2*b*. By adding the negative of the error signal, curve 48, FIG. 2*c*, to the original input signal and applying this signal to the system, the output is, as desired, a linear response to the original input signal.

Figure 3:
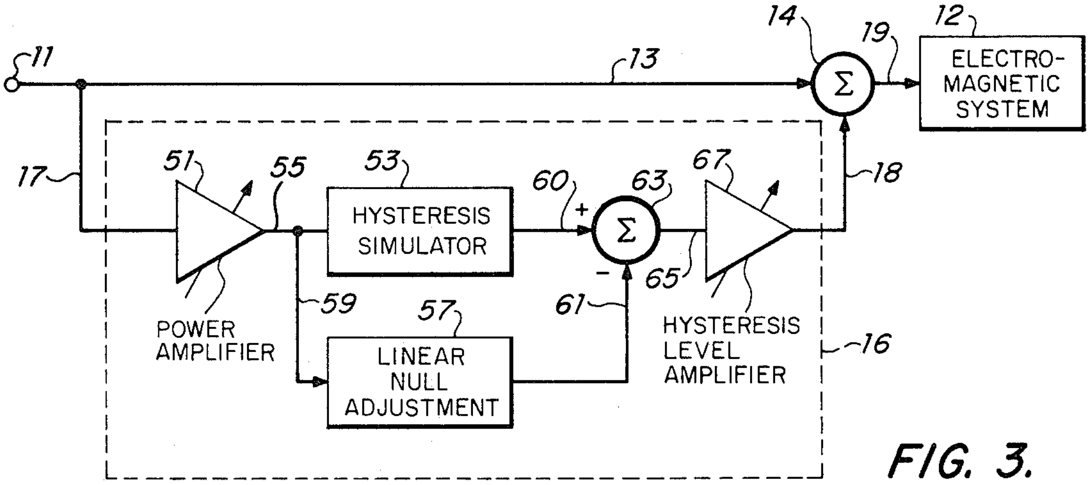
FIG. 3 is a more detailed block diagram of a preferred embodiment of the electromagnetic compensating device as employed with an electromagnetic system.

When dealing with an electromagnetic system which may respond along any of a number of transfer curves in as complex a manner as represented by transfer function 21, compensation becomes extremely difficult since a compensation device must behave in a manner identical with the negative of the error signal of the system transfer function. Further, electromagnetic system transfer functions vary from system to system. A block diagram of the compensation device 16 for accomplishing this complex task is depicted in FIG. 3.

An input signal received at terminal 11 is transmitted to one of the input terminals of network 14 via lead 13. The signal, (fed to power amplifier 51 via lead 17) is also sampled by the compensation device 16. Sampling lead 17 feeds to an adjustable power amplifier 51 the output from which is fed to a hysteresis simulator 53 via lead 55 and a linear null adjustment circuit 57 via lead 59. Outputs from both the simulator 53 and null adjustment circuit 57 are connected to respective input terminals 60 and 61 of a summation network 63. Note that the input 60 is positive and the input 61 is negative. The output of summation network 63 appearing on lead 65 is connected to a variable gain hysteresis level amplifier 67, the output of which is the output lead 18 of the device 16.

Amplifier 51 not only provides amplification of the signal but assures linearity between the signals on lead 17 and lead 55. This is a necessity since the simulator 53 is a highly inductive device, having a non-linear core material which presents a high output impedance. The signal passes through simulator 53 where there is a simulated signal appearing on the appropriate point of curve 49, FIG. 2*c* (due to the transfer function of the output.) At the same time the output of amplifier 51 is transmitted to linear null adjustment circuit 57 over lead 59. Linear null adjustment circuit is a filter which responds to the input by producing a signal output, depicted by the curve 48, FIG. 2*c*.

This signal on lead 61 is subtracted from the total transfer function of the simulator 53 and appears via lead 60 at summation network 63 to produce only that signal representative of the non-linear portion of the transfer function 48, FIG. 2*c*, at lead 65. The resulting signal at lead 65 is amplified in hysteresis level amplifier 67 and then is applied to summation network 14 via lead 18. Amplifier 65 equates in magnitude the resulting signal with the original signal appearing on lead 13.

Since each electromagnetic system possesses varied transfer functions, the compensation device 16 must be capable of adjustment to the irregularities of any individual electromagnetic system 12. In order that this may be accomplished, the power amplifier 51 and the hysteresis level amplifier 67 are both adjustable devices. Hysteresis level amplifier 67 determines the maximum envelope of the transfer function 49. Adjustment of amplifier 51 determines the position of the knee or turning point of the transfer function. When a compensation device 16 is matched with an electromagnetic system 12, a sweep signal generator (not shown) is connected to terminal 11 to provide a range of input signals. A monitor (not shown) such as a cathode ray tube is connected to the output of system 12. As the generator sweeps through various inputs, the monitor is observed and circuits 51 and 67 are adjusted to produce a linear output signal.

Commercially available operational amplifiers may be used for the amplifiers 51, 67 and summing networks 14 and 61. The linear null adjustment circuit 57 may be a filter network with a potentiometer to make the filter adjustable.

Figure 4:
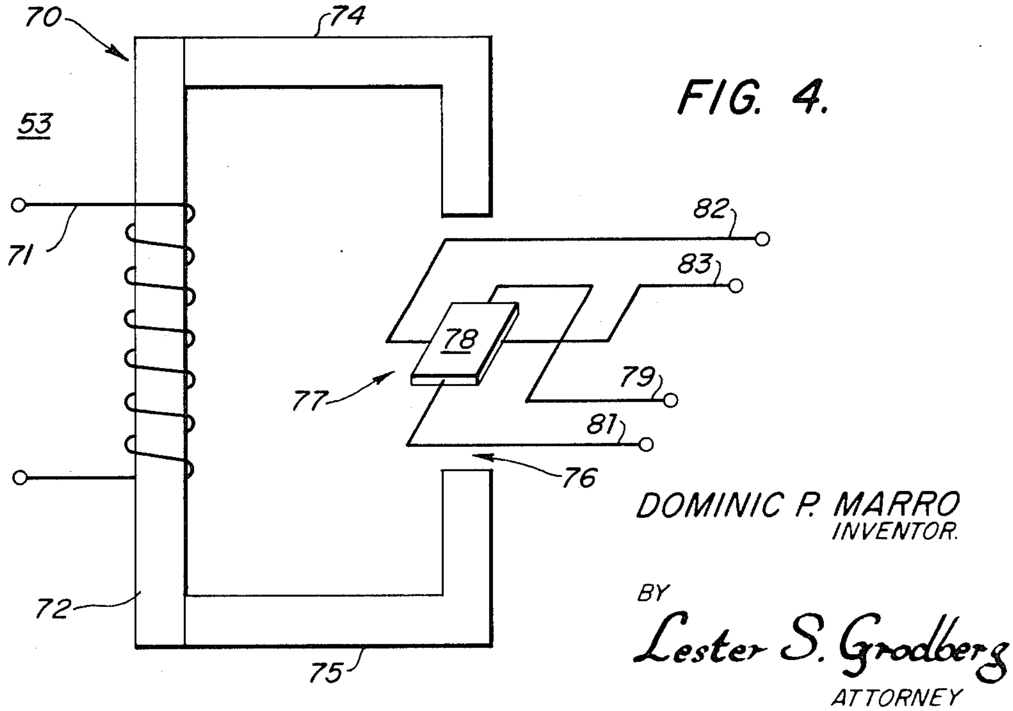
FIG. 4 is a side elevation of a hysteresis simulator which may be used in the embodiment of FIG. 3; and, FIG. 5 is a partial cutaway side elevation and schematic-block diagram of an image motion compensation system with linear compensation.

The hysteresis simulator 53, FIG. 4, consists of an electromagnet 70 and a Hall-effect sensor 77. The electromagnet 70 has an inductive coil 71 wound about a rod 72 of high magnetic permeability metal such as cold rolled steel and two L-shaped members 74 and 75 which may be of the same material. The rod 72 and members 74 and 75 are placed together to form a rectangular member with an air gap 76. Sensor 77 is placed within the air gap. The sensor consists of a rectangular plate 78 of semiconductor material with thickness relatively small in relation to its length and width. Four leads 79, 81, 82, 83 are connected, one to each of the four ends of the device. Leads 79 and 81 are biased with a source of current, not shown, and the output signal is transmitted over leads 82, 83.

The electromagnet 70 is designed to have a transfer function as depicted by curve 49, FIG. 2c. For a given input current I a magnetic flux field *B* appears across the air gap 77. In response to the perpendicular field in the air gap and the bias current through the semiconductor received via bias leads 79 and 81, a voltage is impressed across leads 82 and 83. This voltage is directly proportional to the magnetic field *B* across the gap 76 of the electromagnet 70.

A discussion of Hall-effect devices is set forth in Bulman, W. E. "Applications of the Hall Effect", in *Solid State Electronics*, (Pergemen Press 1966. Vol. 9, pp. 351–372.)

The transfer function of the simulator may be selected by design of the geometry, material and size of the simulator. This ability to select the transfer function of simulator 53 plus the effect of adjustable components 51 and 67, FIG. 3, provide the device with a flexibility to produce a large range of varied transfer functions. Hence the device may be virtually universal in application.

An example of the type of electromagnetic system in which the compensation device 16 has been particularly useful is an image intensifier tube with electromagnetic image stabilization coils.

Figure 5:
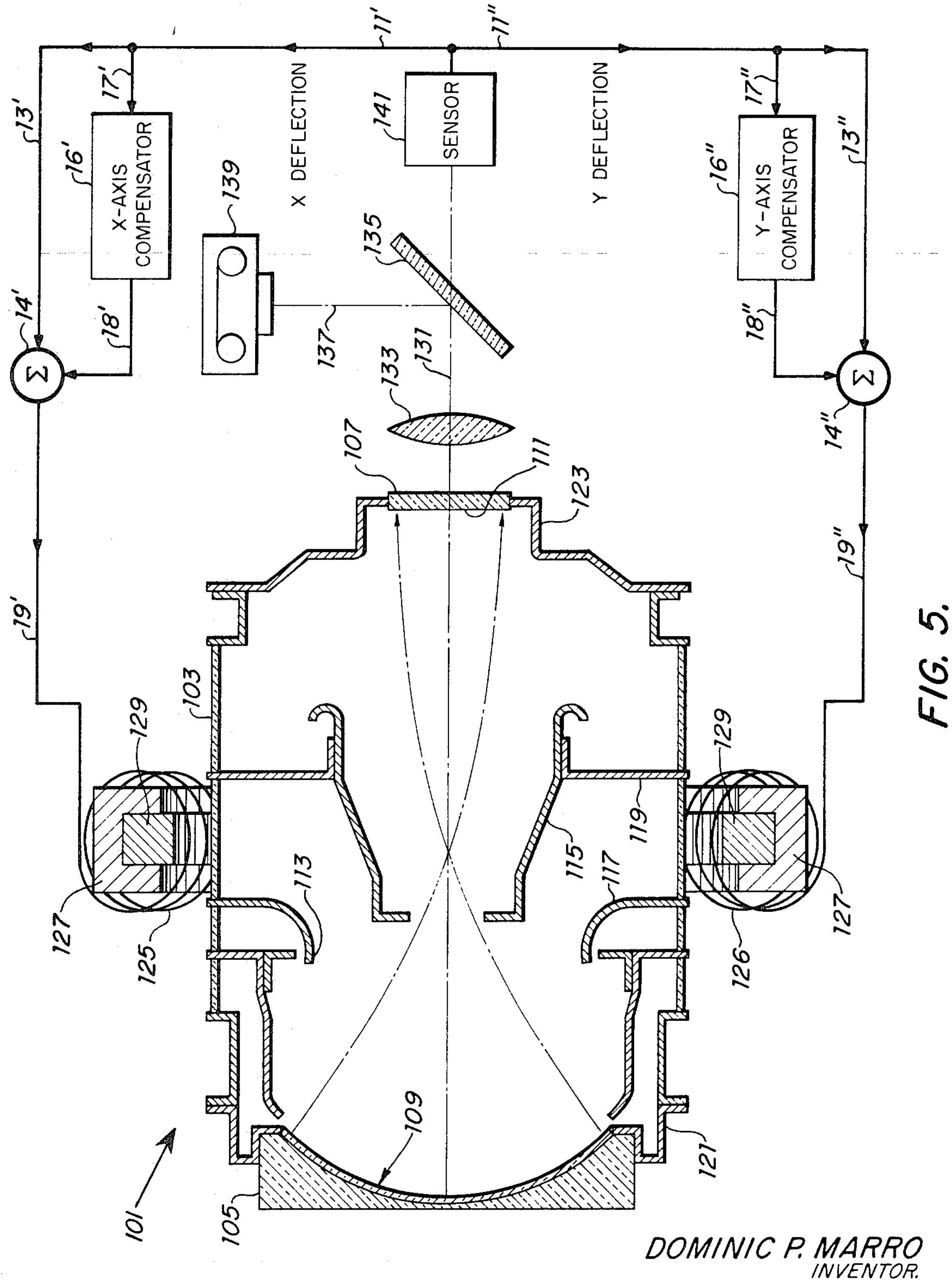

An image intensifier tube 101, FIG. 5, employing magnetic particle deflection for image stabilization includes a substantially cylindrical envelope 103 with an input or sensing end piece 105 and an output or viewing end piece 107. The input end 105 has photocathodic material 109 deposited on its inner face and the output end has a phospher 111 deposited on its inner face. Positioned within the cylinder 103 is a focus ring 113 and an anode cone 115, both suitably supported by members 117 and 119. The end faces 105 and 107 are bonded to, supported by and held in place by rings 121 and 123, which are bonded to the cylinder 103.

Deflection coils 125, 126 surrounding the cylinder 103 are wound about a core 127, encircling cylinder 103, having pole pieces 129 mounted at spaced intervals, therein.

Proximate to and along the image axis 131 of output face 107 is a projection lens 133 and reflection means 135 which is shown as a beamsplitter or diachroic mirror. Part of the image energy is directed along viewing axis 137 to a viewing device or recorder such as camera 139. The remaining energy passes through the mirror 135 to a sensor 141. The electrical output of the sensor 141 is directed along lines 11′ and 11″, line 11′ being an x-axis deflection channel and line 11″ being a y-axis deflection channel. The x-axis channel has a branch line 17′ which transmits the signal to an X electromagnetic compensation device 16′, the output of which is connected by lead 18′ to one input of a summation network 14′. The other input of summation network 14′ is connected by lead 13′ to sensor 141. The output of network 14′ is connected by lead 19′ to the x-axis deflector coils 125.

An identical circuit arrangement is used for the y-axis channel deflector. Reference numerals in the y-axis system are designated by double primed subscripts (″).

U.S. Pat. No. 3,393,320, issued July 16, 1968, invented by E.R. Arazi entitled *Data Pattern Motion Cancellation System Using Image Amplifier with Electrical Deflection of The Electron Stream* and having an assignee common with the assignee of this invention, discloses the general operation of image motion stabilization systems. With no signal applied to coils 125, 126, photons from an image enter the tube 101 at input end piece 105 and cause the release of particles from the photocathodic surface 109 which particles are accelerated by the negatively biased focus ring 113 and positively biased anodic cone 115. The particles strike phospher surface 111 and the image is reproduced on face 107 in inverted form. Amplification or intensification of the image is accomplished by the acceleration of particles through focus ring 113 by cone 115 thereby causing a greater energy level at the phospher 111 which results in image intensification.

The optical image appearing at face 107 is projected through lens 133 to the beamsplitter 135 where the image is split. One of the split images is reflected along the viewing axis 137 to the focal plane of the camera 139. The camera is only representative of any of a number of light receptive devices such as the human eye, image orthicon or camera. The other portion of the split image is transmitted along axis 131 to sensor 141 which photoelectrically senses the image position and compares it with a reference position to produce x-axis and y-axis error signals which indicate both in magnitude and direction, the image displacement. The x error signal is transmitted along line 11′ through summation network 14′ to x-axis deflector coil 125. The signal on line 17′ is sampled by the x-axis compensation circuit 16′ and fed to summation network 14′ to provide a compensation signal to the system, in this instance x-deflection coils 125. Y-deflection signals on lead 11'' follow a similar route to y-deflection coils 126.

A current passes through the coils 125 and 126 causing a magnetomotive force which interacts with core 127 and pole pieces 129 to generate a magnetic flux. This flux deflects charged particles traveling from tube input end piece 105 to tube output end piece 107. Input signals to the deflection system compensation for image motion and thus produce a stabilized image at end piece 107.

Cylinder 103, end pieces 105 and 107 are made of glass. All of the metallic pieces in the tube 101: focus ring 113, support pieces 117, 119 and 121, anode cone 115 and support pieces 117, 119 and 121 are typically made of Kovar which is a metal alloy of nickel, cobalt and iron. The primary reason for using Kovar is that its coefficient of thermal expansion substantially identical to the thermal expansion coefficient of glass. Therefore, Kovar is extensively used where metal-to-glass seals are required to maintain a vacuum. A description of the physical properties of Kovar is contained in *Physical Metallurgy for Engineers*, Guy, Abbertes, (Addison-Wesley Publishing Company, Inc., Reading, Mass. 1962 Page 192.)

A disadvantage of Kovar, however, is its magnetic properties. In the presence of a time-varying magnetic field, Kovar exhibits a high magnetic remanance. Particle deflection in the intensifier of FIG. 5 will exhibit a non-linear relationship with applied electrical signals. The primary contribution to this non-linear transfer function is the Kovar present in the tube, which tends to distort the output deflective force produced by coils 125, 126. Therefore, it is a necessity to use compensation circuitry 16' for x-axis compensation and circuitry 16'' for y-axis compensation to obtain linear deflection of particles in response to the output of sensor device 141. Thus the deflection coil current is truly representative of the relative image shift, greatly enhancing the dynamic response and linearity of the system.

Other embodiments will occur to those skilled in the art and are within the following claims:

What is claimed is:

1. An open loop system for compensating for the non-linear response to an input signal of an electromagnetic means in an electron tube having a source of electrons at one end of the tube, an electron target at a second end of the tube, and an electromagnetic means for influencing the path of electrons traveling from said source at one end of the tube to said target at the second end of the tube and comprising:

a. an electromagnetic means for an electron tube having a source of electrons at one end of the tube, an electron target at a second end of the tube, and an electromagnetic means for influencing the path of electrons traveling from said source at one end of the tube to said target at the second end of the tube, said electromagnetic means having a non-linear response to an input signal, said non-linear response being dividable into a linear response component and a non-linear response component;

b. a sensor means for supplying an input deflection signal to said electromagnetic means, said electromagnetic means being responsive to the input deflection signal to deflect the path of electrons traveling from said source at one end of the tube to said target at the second end of the tube;

c. an open loop circuit means for sensing an input signal applied to said electromagnetic means and for producing a signal which simulates the non-linear response component of said electromagnetic means and which, when combined with the input signal, allows said electromagnetic means to respond to the input signal with a substantially linear response;

d. means for combining the input signal applied to said electromagnetic means and the signal produced by said open loop circuit means to produce a combined signal; and e. means for applying the combined signal to said electromagnetic means, thereby obtaining a substantially linear response by said electromagnetic means to the input signal.

2. A system as set forth in claim 1 wherein said open loop circuit means includes a hysteresis simulator.

3. A system as set forth in claim 2 wherein hystersis simulator includes a Hall-effect sensor.

4. A system as set forth in claim 3 wherein said open loop circuit means includes an adjustor means for normalizing the signal produced by said open loop circuit with the input signal to said electromagnetic means.

5. A system as set forth in claim 4 wherein said adjustment means includes an adjustable amplifier.

6. A system as set forth in claim 5 wherein said combining means includes a summation network.

7. A system as set forth in claim 6 wherein said Hall-effect sensor includes magnetic material which is identical to the magnetic material used in said electromagnetic means.

8. A system as set forth in claim 7 wherein said magnetic material is Kovar.

9. A system as set forth in claim 3 wherein said Hall-effect sensor includes magnetic material which is identical to the magnetic material used in said electromagnetic means.

10. A system as set forth in claim 9 wherein said magnetic material is Kovar.

11. A system as set forth in claim 10 wherein said open loop circuit means includes an adjustor means for normalizing the signal produced by said open loop circuit with the input signal to said electromagnetic means.

* * * * *